(12) United States Patent
Blythe

(10) Patent No.: US 7,954,725 B2
(45) Date of Patent: Jun. 7, 2011

(54) SECURE PAYMENT CARD WITH STATIC AND VARIABLE DATA

(75) Inventor: Simon Blythe, Ely (GB)

(73) Assignee: Mastercard International, Inc., Purchase, NY (US)

(*) Notice: Subject to any disclaimer, the term of this patent is extended or adjusted under 35 U.S.C. 154(b) by 122 days.

(21) Appl. No.: 11/966,141

(22) Filed: Dec. 28, 2007

(65) Prior Publication Data

US 2009/0166435 A1 Jul. 2, 2009

(51) Int. Cl.
*G06K 19/06* (2006.01)
(52) U.S. Cl. ........................................................ 235/493
(58) Field of Classification Search .................. 235/380, 235/449, 493, 494; 417/50
See application file for complete search history.

(56) References Cited

U.S. PATENT DOCUMENTS

| | | | | |
|---|---|---|---|---|
| 3,677,667 A | * | 7/1972 | Morrison | 417/474 |
| 4,215,812 A | * | 8/1980 | Chancel | 235/493 |
| 5,160,833 A | * | 11/1992 | Nakahara | 235/449 |
| 6,764,005 B2 | * | 7/2004 | Cooper | 235/449 |
| 7,641,124 B2 | * | 1/2010 | Brown et al. | 235/493 |
| 2006/0213973 A1 | * | 9/2006 | Chan et al. | 235/380 |
| 2006/0273419 A1 | * | 12/2006 | Lindblom et al. | 257/421 |

\* cited by examiner

*Primary Examiner* — Seung H Lee
(74) *Attorney, Agent, or Firm* — Hoffmann & Baron, LLP

(57) ABSTRACT

In a first aspect of the subject invention, a secure payment card is provided, including: a flat body, the flat body having a patterned channel in proximity to a first face of the flat body; an elongated magnetic stripe disposed on the first face of the flat body, the magnetic stripe extending along a longitudinal axis, wherein at least a portion of the channel being located under the longitudinal axis; and a magnetic fluid disposed in the channel, the magnetic fluid configured to define a readable magnetic pattern.

12 Claims, 6 Drawing Sheets

SECURE PAYMENT CARD WITH STATIC AND VARIABLE DATA

FIELD OF THE INVENTION

The invention relates to a secure payment card for use with credit account transactions. Specifically, the invention relates to a secure payment card having a channel of magnetic fluid to create a dynamic data portion of the payment card.

BACKGROUND OF THE INVENTION

Unauthorized and fraudulent use of credit and payment card information is and continues to be a problem of the industry. Unauthorized users can improperly acquire account and card information through the use of many different tactics. Once the account data is skimmed, the unauthorized user may create a clone, or copy, of the card. This is because on a conventional credit card, the magnetic stripe of the card is typically written with static data patterns. During card personalization, conventional cards have one to three static data patterns permanently recorded onto the magnetic stripe. Clones are payment cards which contain a copy of the static data portion of a live card. Often times, unauthorized users of clone cards continue to make purchases on a user's account without the knowledge of the user, while the user retains possession of the original payment card.

SUMMARY OF THE INVENTION

In an aspect of the subject invention, a secure payment card is provided, including: a flat body, the flat body having a patterned channel in proximity to a first face of the flat body; an elongated magnetic stripe disposed on the first face of the flat body, the magnetic stripe extending along a longitudinal axis, wherein at least a portion of the channel being located under the longitudinal axis; and a magnetic fluid disposed in the channel, the magnetic fluid configured to define a readable magnetic pattern.

These and other features of the invention will be better understood through a study of the following descriptive and accompanying drawings.

DETAILED DESCRIPTION OF THE INVENTION

Figure 1:
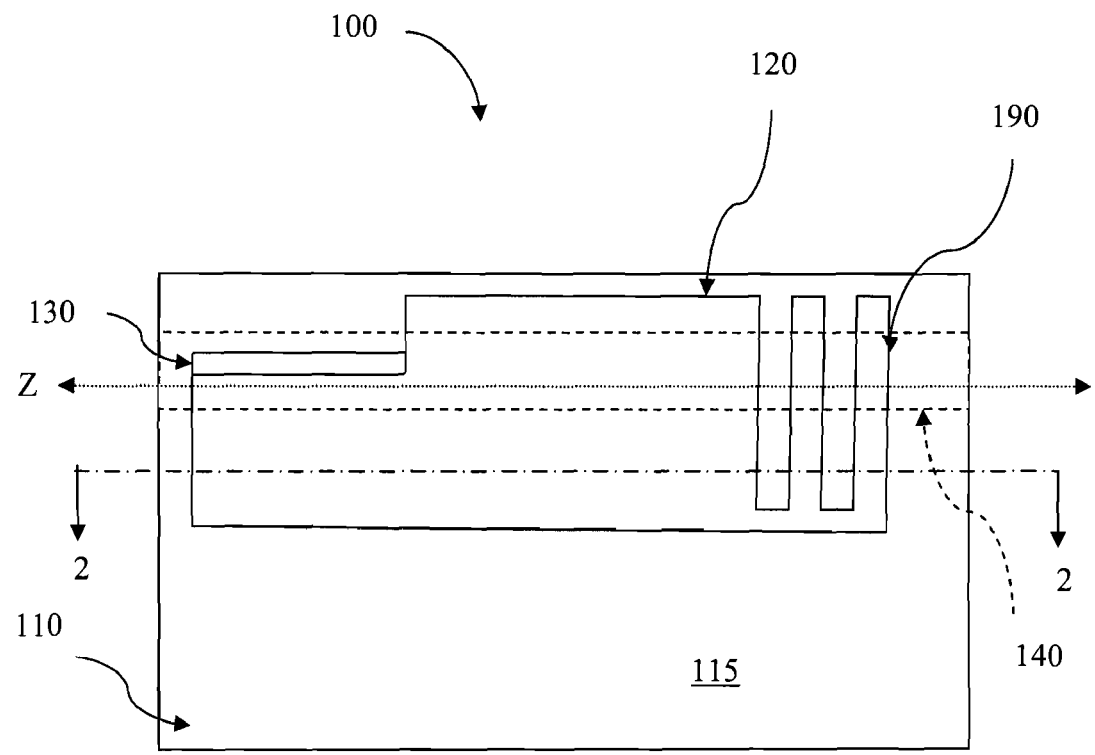
FIG. 1 is a schematic of a secure payment card of the subject invention.

FIG. 1 depicts an embodiment of the secure payment card 100 of the subject invention. The secure payment card 100 may include: a flat body 110, the flat body 110 having a patterned channel 120 in proximity to a first face 115 of the flat body 110; an elongated magnetic stripe 140 disposed on the first face 115 of the flat body 110, the magnetic stripe 140 extending along a longitudinal axis Z, wherein at least a portion of the channel 120 being located under the longitudinal axis Z; and a magnetic fluid 150 disposed in the channel 120, the magnetic fluid 150 configured to define a readable magnetic pattern.

The secure payment card 100 may be configured to have opposing faces 115, 125 (FIG. 1). One face may contain card identifying information and an embossed portion. The other face may contain the magnetic stripe 140 and one or more other security features or information. The magnetic stripe 140 may encode a magnetic data portion which allows a merchant to transact a transaction on behalf of a user, using a credit account of a user. The account information may be magnetically read by a merchant machine, scanner, or card reader, as is known in the art. The secure payment card 100 may be of various shapes and sizes and configured to be associated with a card swipe machine or other machine reader technology to facilitate the transfer of account information and access thereto.

The flat body 110 of the payment card may be composed of one or more materials. By way of non-limiting examples, the flat body 110 of the secure payment card 100 may be composed of material selected from the group consisting of: a plastic, a polymer, a plastic resin, a polyvinyl chloride acetate (PVCA), a dye, an opaquing agent, a plasticizer, a laminate, and combinations thereof.

The secure payment card 100 includes the elongated magnetic stripe 140, which runs along the longitudinal axis Z of the flat body 110. In FIG. 1, the magnetic stripe 140 is shown in dotted lines to avoid obscuring other details. The magnetic stripe 140 is also depicted, for example, in FIGS. 2 through 4. The magnetic stripe 140 may be configured to include a readable magnetic pattern, for example, one to three bands of static data, where the static data is configured to be machine readable by a machine that may read and transmit magnetically encoded data. The readable magnetic pattern of the magnetic stripe 140 includes static data in that the data is not adjustable under normal circumstances. Adjustment of the magnetic pattern would require reconfiguration of the magnetic pattern on the magnetic stripe 140.

Into the first face 110, the channel 120 may be milled, engraved, grooved, laser carved, or the like. Alternatively, the channel 120 may be formed as part of the molding and manufacturing process of the flat body 110. The channel 120 may be operatively configured on the flat body 110 such that the channel 120 crosses at least one of intersect points 190. The intersect point 190, as referenced herein, refers to a portion of the secure payment card 100 where the channel 120 crosses underneath, or otherwise in close proximity to, the longitudinal axis A, which coincides with the elongated magnetic stripe 140. Although there are five intersect points 190 depicted in FIG. 1, the secure payment card 100 of the present invention may have greater or fewer intersect points, as may be desired.

Figure 5:
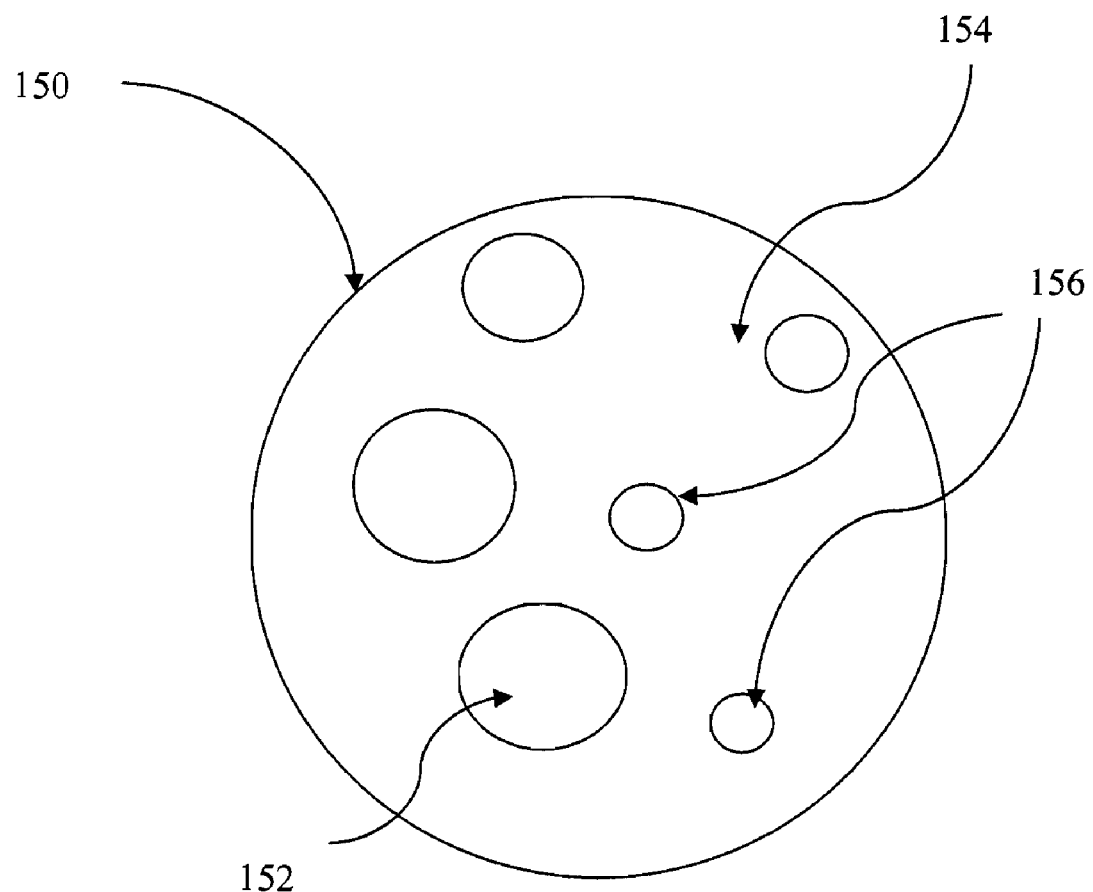
FIG. 5 depicts an enlarged view of a droplet of a magnetic fluid useable with the subject invention.

The channel 120 is of a length, width, and depth sufficient to house and transmit a magnetic fluid 150 through the channel 120. The magnetic fluid 150 may include, for example, a host fluid 154 and a plurality of magnetic particles 152, as shown in FIG. 5. The magnetic fluid 150 may be a high or low viscosity fluid, as may be desired. The magnetic fluid 150 may be a suspension, solute/solvent mixture, or other combinations. The magnetic fluid 150 may be a ferrous fluid. Also, the magnetic fluid 150 may be of a material that exhibits magnetic properties when placed in proximity to a magnetic field. The host fluid 154 may be pure in form, or a combination of materials. For example, the host fluid 154 may comprise water, paraffin oil, mineral oil, or other materials which may be in liquid state at ambient temperatures. Also, the magnetic particles 152 may be of the same, similar, or different sizes in order to work with the subject invention.

The magnetic fluid 150 may also include one or more non-magnetic particles 156 which may be configured to a size and shape to act as, for example, spacers in the channel of magnetic fluid 150. The non-magnetic spacers 156 may be present in the fluid and may operate in the channel 120 such that one or more of the magnetic particles 152 of the magnetic fluid 150 may be separated from one or more of the other magnetic particles 152. As such, the non-magnetic spacers 156 may operate to change the frequency of variable data changes per swipe, or to otherwise limit the mobility of the magnetic particles 152.

In use, as the magnetic fluid 150 travels through the channel 120, the magnetic fluid 150 may travel through one or more of the intersect points 190. Motive force to urge the magnetic fluid 150 may be provided from various sources, including deflection and/or compression of the secure payment card 100, and/or a source of motive force, as described below. Therefore, as the secure payment card 100 may be swiped, the magnetic fluid 150 housed in the channel 120 may be pushed, forced, or otherwise travel along the channel 120 so that one of the magnetic particles 152 in the magnetic fluid 150 is aligned along one or more of the intersect points 190.

When the secure payment card 100 is read, the magnetic stripe 140 will provide static data, which may be obtained from the magnetic pattern thereon. Also, at the intersect point 190 where the channel 120 cross the magnetic stripe 140, a readable magnetic pattern will be defined by the magnetic particles 152. A magnetic card reader or swipe machine will read the data of the magnetic stripe 140 and the pattern at the intersect point 190, to provide a total reading for the card 100. So, for any scan of the secure payment card 100, the magnetically encoded data portion of the user account includes a static data portion written onto the magnetic stripe 140, and a dynamic variable data portion which is a function of where the magnetic particles 152 of the magnetic fluid 150 are aligned with one or more of the intersecting points 190. The magnetic particles 152 may be rearranged to define a different pattern by moving the magnetic fluid 150 through the channel 120. In this manner, clones of the payment card 100 may be minimized.

To have the variable data rearranged, the secure payment card 100 may be swiped a subsequent time, for example, in the case of making a second transaction. Before and/or during a second swipe of the secure payment card 100 the magnetic fluid 150 may be caused to move in the channel 120, thereby causing the magnetic particles 152 to be rearranged.

With a static portion and a dynamic portion of data, the secure payment card 100 will have consistently a fixed set and a changing set of data throughout use. Due to the static set of data, a vendor will be able to properly process transactions. The variable set of data will limit the ability to clone the secure payment card 100. The vendor will be reviewing transactions based on the secure payment card 100 to ensure changes are present in the dynamic data. With repetition of the data which should be dynamic (i.e. changing), an alert can be raised that the dynamic data has been copied with the static data and clones being produced.

The variable data may change each time that the secure payment card 100 is swiped. Alternatively, the variable data may change over a predetermined number of swipes, for example 5 swipes. This can be controlled through the characteristics of the magnetic fluid 150 (e.g. low viscosity liquid containing a high quantity of magnetic particles may have repeating patterns in circulation through the channel 120). Also, the variable data portion may be a function of the number of the magnetic particles 152 in the host fluid 154. Further, the variable data portion may be a function of the spacing between magnetic particles 152. Still yet, the variable data portion may be a function of how many of the intersect points 190 are utilized.

Figure 3:
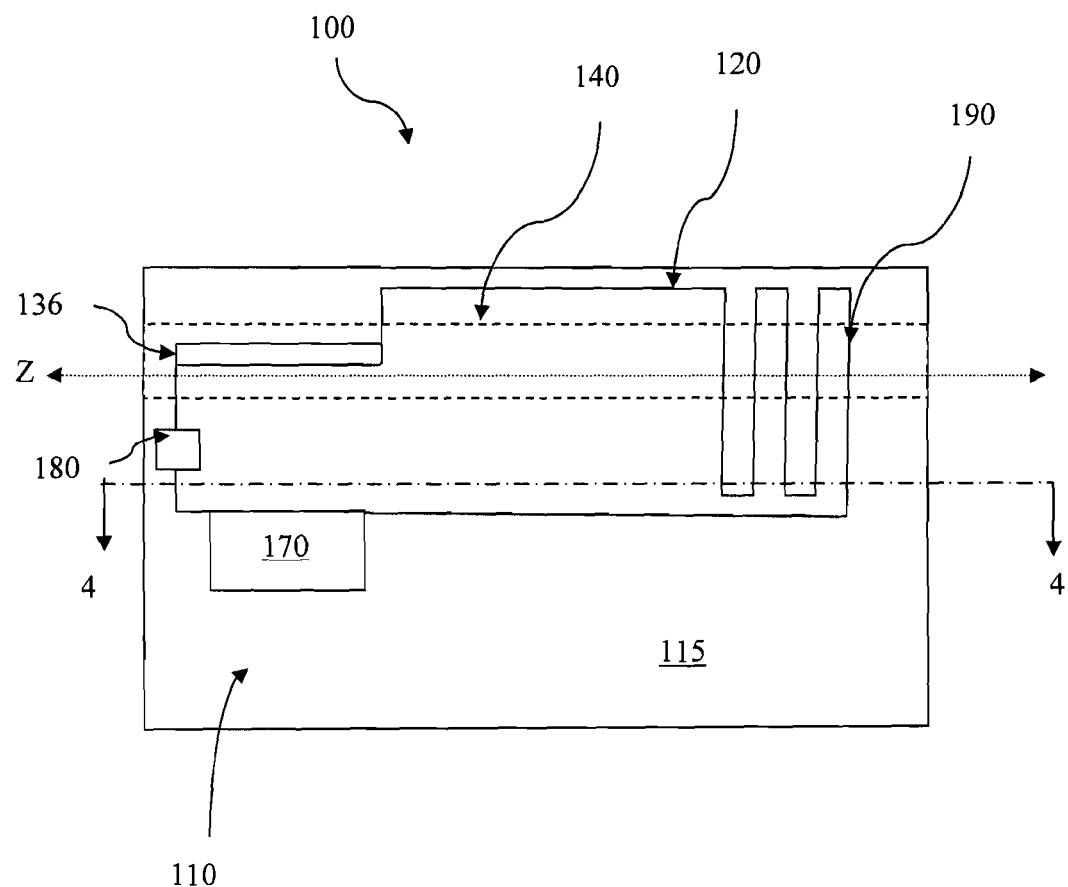
FIG. 3 is a schematic of a further embodiment of a secure payment card of the subject invention.

FIG. 1 and FIG. 3 depict additional features which may be present in the secure payment card 100 of the subject invention 100. The secure payment card 100 may be further configured to include, for example, a pump 130 (shown in FIG. 1), a one-way valve 180 (shown in FIG. 3), and/or a reservoir 170 (shown in FIG. 3).

The pump 130 is operatively connected to the channel 120 to urge the magnetic fluid 150. In such a manner, the pump 130 may accept magnetic fluid 150 from one end of the channel 120 and pump the magnetic fluid 150 into another end of the channel 120. The pump 130 may be, for example, a peristaltic pump 136 (shown in FIG. 3) aligned along the longitudinal axis (Z axis) of the flat body 110 of the secure payment card 100. As another example, the pump 130 may be an electrical displacement pump. The electrical displacement pump may, for example, be a micro electromechanical system configured to into or onto a portion of the flat body 110 and associate one end of the channel 120 to the other end of the channel 120 and move the magnetic fluid 150 through the channel 120.

The one-way valve 180 of the secure payment card 100 may be operatively located along the channel 120 and configured to allow a one-way flow of the magnetic fluid 150. In such a manner, the magnetic fluid 150 in the channel 120 of the flat body 110 of the secure payment card may only run in a single direction. This may facilitate the computation and calculation of the correct and incorrect variable data readings, which may aid an entity in determining whether a card use or transaction is authorized or unauthorized and fraudulent. The one-way valve 180 may be located in close proximity to the pump 136. The one-way valve may be located at the output end of the pump 136 or at the input end of the pump 136 in order to prevent back flow of the magnetic fluid 150.

The reservoir 170 may house or hold excess magnetic fluid 150 and transmit the magnetic fluid 150 into the channel 120 of the secure payment card 100. In such a manner, the reservoir 170 may transmit different sized particles into the system, or space the particles differently to change the frequency of swipes necessary to effectuate a variable data change.

Figure 2:
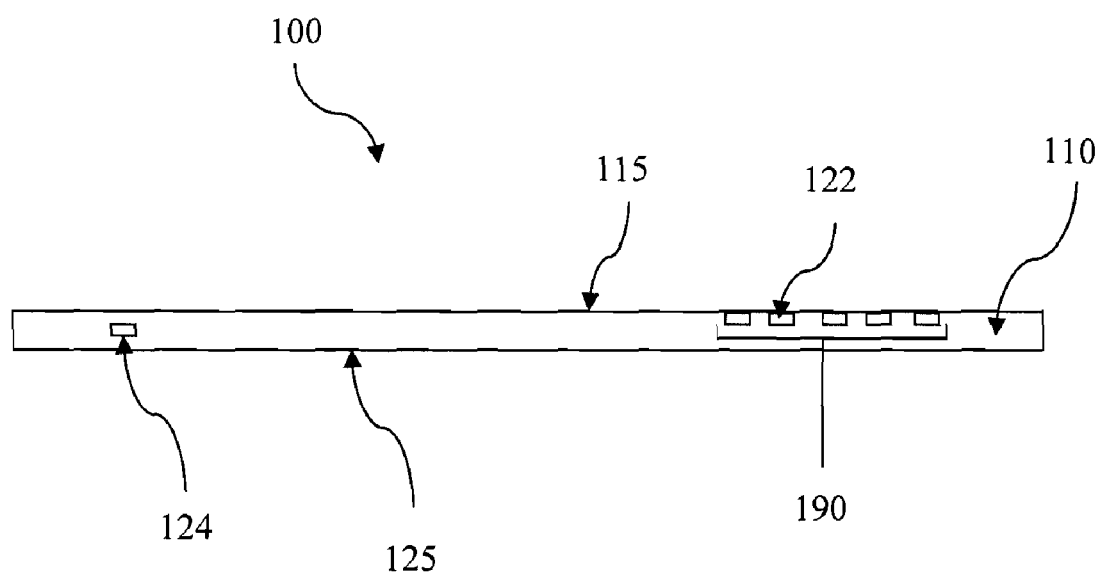
FIG. 2 is a cross-sectional view taken along like 2-2 of FIG. 1.

With both the encoded magnetic stripe 140 and the magnetic fluid 150 in the underlying channel 120, it may be necessary to shield the static data portion of the magnetic stripe 140 from magnetic interference which may be caused by the close proximity of the magnetic fluid 150. As depicted in FIG. 2, the channel 120 may be integrated into the flat body 110 of the secure payment card 100 at a first depth 122 and a second depth 124. The first depth 122 may be located at the intersect points 190 of the channel 120. As such, the magnetic fluid 150 may affect the magnetic stripe 140 in the region of variable data (i.e. the intersecting points 190). The second depth 124 of the channel 120 may be at a static region of data on the magnetic stripe 140. The second depth 124 of the channel 120 may a greater depth or distance from the magnetic stripe 140 than the first depth 122, to avoid magnetic interference with or corruption of the static portion of data encoded on the non-contact region of the magnetic stripe 140.

Figure 4:
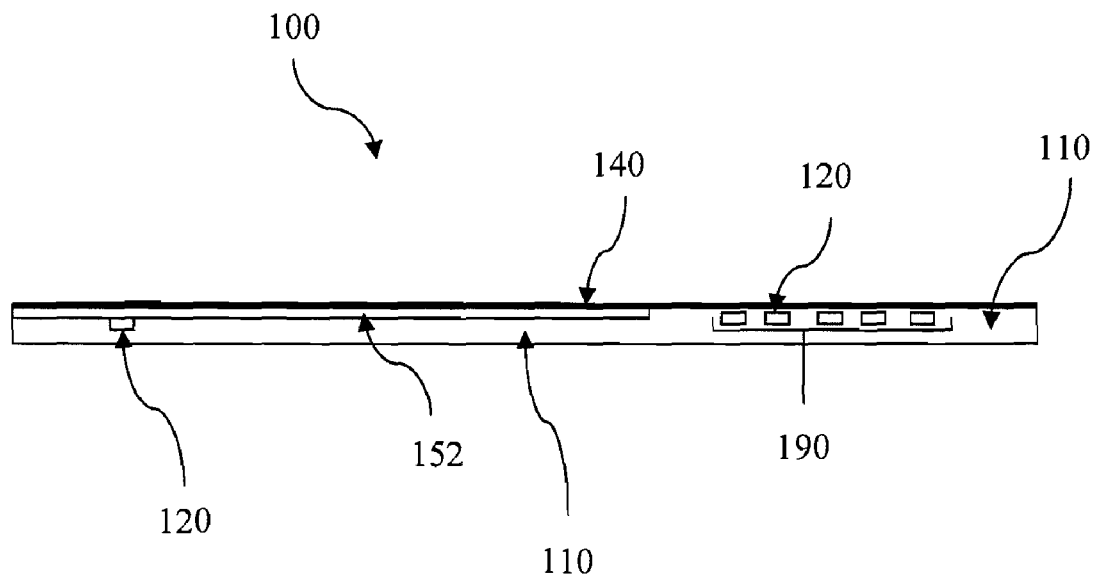
FIG. 4 is a cross-sectional view taken along line 4-4 of FIG. 3.

Alternatively, as shown in FIG. 4, the secure payment card 100 may include a magnetic shielding material 152. The magnetic shielding material 152 may be configured to shield a static portion of the magnetic stripe 140 from magnetic interference from the magnetic fluid 150 in the channel 120. The magnetic shielding material 152 may be an additional layer of material that the flat body 110 may be composed of. As another example, the magnetic shielding material 152 may be a laminate 154 which may act as a magnetic sealant, preventing magnetic fields from crossing or interfering with one another. Varying the channel 120 depths and including magnetic shielding material 152 may be used in combination, as well as with other technologies and known methods for reducing magnetic interference.

Figure 6:
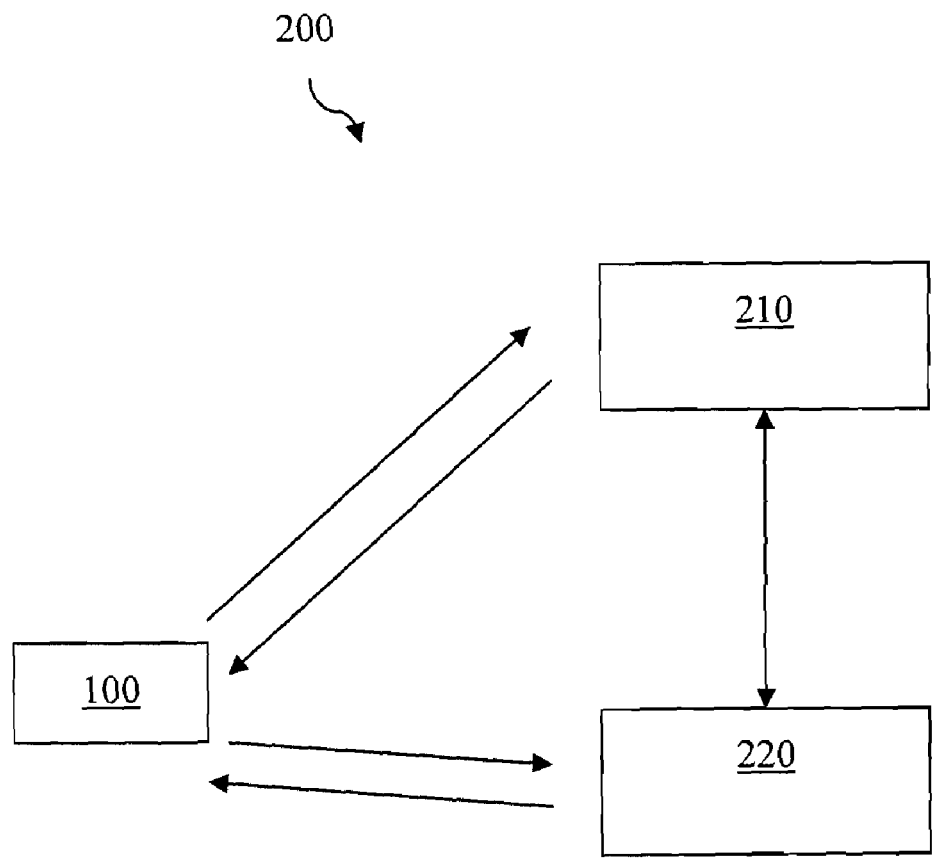
FIG. 6 depicts an embodiment of a system usable with the subject invention.

With reference to FIG. 6, the secure payment card 100 may be used in conjunction with a secure payment system 200. The secure payment system 200 may include, for example, the secure payment card 100, a point of sale terminal 210, and a monitoring entity 220. The secure payment card 100 may have static data and a variable data, as disclosed and discussed previously. The static data and the variable data may together be the complete magnetically readable identifier encoded on the secure payment card 100. The identifier may correlate the card 100 to the user account in order to transact one or more transactions on credit from the user's account.

A point of sale terminal 210 may refer to the transaction point at which a user provides the secure payment card 100 and magnetically encoded information to purchase goods or services. A point of sale terminal may refer to a purchase in store using a merchant computer system, card reading device, scanner, or the like to purchase goods or services. The point of sale terminal 210 may be operatively configured to accept and read the static data element and the variable data element from the secure payment card 100 upon swiping, scanning, or otherwise electronically entering the data.

The monitoring entity 220 may refer to the secure payment card 100 usage monitor. The monitoring entity may include a server, a web-based database, a computer system, a computer network, and the like. The monitoring entity 220 may have the user's information, account information, and secure payment card 100 information, including the static data and the possible variable data. The monitoring entity 220 may keep a record, entry, or other information of past transactions with the secure payment card 100 so as to effectively and efficiently monitor the usage of the secure payment card 100, including the past variable data readings. Through such information, the monitoring entity 220 may compare a current variable data 222 to a listing of potential variable data of the secure payment card 100 and determine whether the current variable data 222 is accorded to an authorized use of the secure payment card 100 or an unauthorized use. The monitoring entity 220 may be further configured to flag a suspicious variable data or a user account. Also, the monitoring entity 220 may be configured to alarm one of the user, the payment card company, the point of sale terminal, additional entries (i.e. law enforcement), or combinations thereof of the suspicious usage of the account. The alarm may be in one or more forms to inform one or more parties of the suspicious usage of the card. In addition to an alarm, the monitoring entity 220 may also suspend or disable an account until a user is reached. This may be done in order to prevent continued unauthorized or fraudulent use of the secure payment card 100 after such use is discovered.

The variable data of the secure payment card 100 may be continuously and dynamically updated to different variable data throughout the life of the secure payment card 100. This continual updating will in turn allow more effective monitoring of secure payment card usage 100. A fraudulent user of an invalid clone or copy of the card will be more easily identified and stopped from making fraudulent charges to the user's account using the clone card, as the magnetic pattern of the encoded data on the clone card will always read at the same variable data portion. As such, the exploitability of the secure payment card 100 will be lower than typical credit and/or payment cards.

A number of embodiments of the invention have been described. Nevertheless, it will be understood that various modifications may be made without departing from the spirit and scope of the invention. Also, the steps described above may be modified in various ways or performed in a different order than described above, where appropriate. Accordingly, alternative embodiments are within the scope of the following claims.

What is claimed is:

1. A secure payment card comprising:
   a flat body, said flat body having a patterned channel in proximity to a first face of said flat body;
   an elongated magnetic stripe disposed on said first face of said flat body, said magnetic stripe extending along a longitudinal axis, wherein at least a first portion of said channel being located under, and overlapping with, said longitudinal axis, said first portion of said channel being located adjacent to said magnetic stripe, wherein said magnetic stripe includes a readable magnetic pattern; and
   a magnetic fluid disposed in said channel, said magnetic fluid configured to define a readable magnetic pattern in said first portion of said channel,
   wherein said magnetic pattern defined by said magnetic fluid is located in proximity to, and is separately readable from, said magnetic pattern of said magnetic stripe, said magnetic pattern defined by said magnetic fluid and said magnetic pattern of said magnetic stripe collectively defining a single magnetically readable identifier.

2. The secure payment card of claim 1, further comprising a one-way valve, said one-way valve operatively located along said channel and configured to allow a one-way flow of said magnetic fluid.

3. The secure payment card of claim 1, wherein said magnetic fluid further comprises a host fluid and a plurality of magnetic particles.

4. The secure payment card of claim 1, further comprising a pump, said pump operatively connected to said channel to urge said magnetic fluid through said channel.

5. The secure payment card of claim 4, wherein said pump is a peristaltic pump.

6. The secure payment card of claim 1, wherein said magnetic pattern defined by said magnetic fluid is readable with said magnetic pattern of said magnetic stripe.

7. The secure payment card of claim 1, wherein said flat body includes one or more from the group consisting of: a plastic, a polymer, a plastic resin, a polyvinyl chloride acetate (PVCA), a dye, an opaquing agent, a plasticizer, a laminate, and combinations thereof.

8. The secure payment card of claim 1, wherein said channel crosses said elongated magnetic stripe at a plurality of intersect points.

9. The secure payment card of claim 1, wherein the channel may be integrated into the flat body of the secure payment card at a first depth and a second depth, said first depth being greater than said second depth.

10. The secure payment card of claim 9, wherein said channel said first depth located at the plurality of intersect points of the channel and said elongated magnetic stripe and said second depth of said channel at a non-contact portion of said flat body.

11. The secure payment card of claim 10, wherein said channel is formed with said first depth at said portions of said channel located in proximity to said longitudinal axis, further wherein said channel with said second depth at portions of said channel spaced from said longitudinal axis.

12. The secure payment card of claim 1, further comprises a magnetic shielding material, said magnetic shielding material configured to shield said magnetic stripe from magnetic interference from said magnetic fluid in said channel.

* * * * *